(12) United States Patent
Vignes et al.

(10) Patent No.: US 10,461,517 B1
(45) Date of Patent: Oct. 29, 2019

(54) PROTECTIVE HOUSING FOR AN ELECTRICAL INSTALLATION AND ELECTRICAL INSTALLATION INCLUDING SUCH A HOUSING

(71) Applicant: Schneider Electric Industries SAS, Rueil Malmaison (FR)

(72) Inventors: Thierry Vignes, Meylan (FR); Pascal Lepretre, Les Marches (FR)

(73) Assignee: SCHNEIDER ELECTRIC INDUSTRIES SAS, Rueil Malmaison (FR)

( * ) Notice: Subject to any disclaimer, the term of this patent is extended or adjusted under 35 U.S.C. 154(b) by 0 days.

(21) Appl. No.: 16/392,716

(22) Filed: Apr. 24, 2019

(30) Foreign Application Priority Data

Jun. 8, 2018 (FR) ..................................... 18 55011

(51) Int. Cl.
*H02G 5/04* (2006.01)
*H01B 17/66* (2006.01)
*H02G 3/08* (2006.01)

(52) U.S. Cl.
CPC .............. *H02G 5/04* (2013.01); *H01B 17/66* (2013.01); *H02G 3/083* (2013.01)

(58) Field of Classification Search
CPC ........... H02G 5/04; H02G 3/083; H01B 17/66
USPC ........................................................ 174/541
See application file for complete search history.

(56) References Cited

U.S. PATENT DOCUMENTS

| 4,658,504 A | 4/1987 | Sinharoy et al. | |
|---|---|---|---|
| 2009/0023313 A1* | 1/2009 | Hayakawa | H05K 7/026 439/76.2 |
| 2014/0084914 A1* | 3/2014 | Nakajima | G01R 15/207 324/252 |
| 2018/0065576 A1* | 3/2018 | Kawaguchi | H01R 9/226 |

FOREIGN PATENT DOCUMENTS

| DE | 7044493 U | 3/1971 |
|---|---|---|
| DE | 195 42 867 C1 | 12/1996 |
| KR | 2003-0026523 | 4/2003 |

OTHER PUBLICATIONS

French Preliminary Search Report dated Feb. 8, 2019 in French Application 18 55011, filed on Jun. 8, 2018 (with English translation of categories of Cited Documents and Written Opinion).

* cited by examiner

*Primary Examiner* — Sherman Ng
(74) *Attorney, Agent, or Firm* — Oblon, McClelland, Maier & Neustadt, L.L.P.

(57) ABSTRACT

An electrically insulating protection box for an electric installation includes at least one electric busbar, the protection box including at least two casings wherein each casing includes inside surfaces intended to surround at least a part of the busbar at a junction zone, at least 50% of the area of said inside surfaces being in direct contact with an electrically conducting element of the junction zone.

24 Claims, 3 Drawing Sheets

Figure 1:
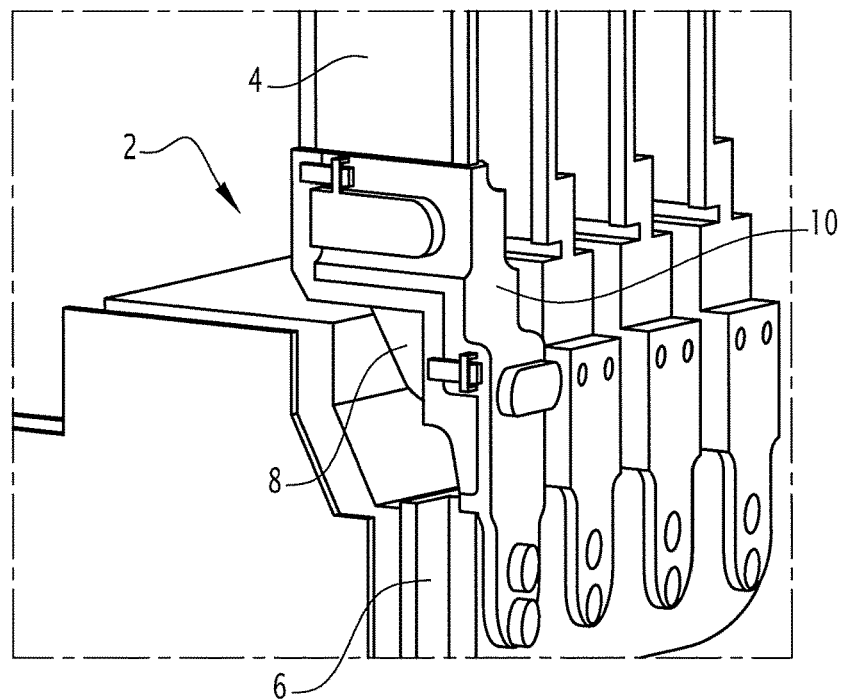

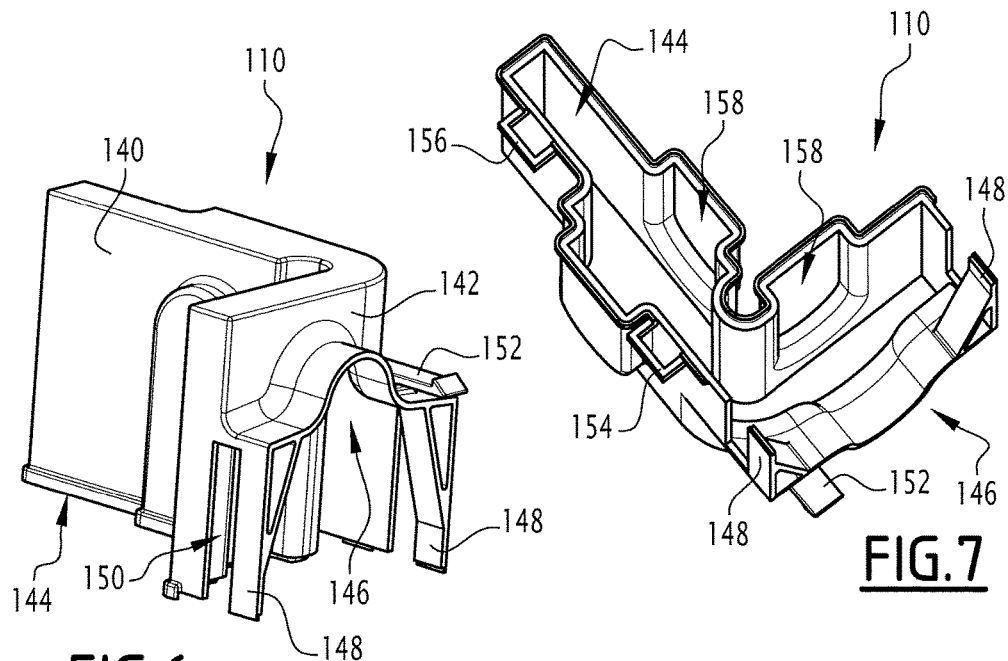
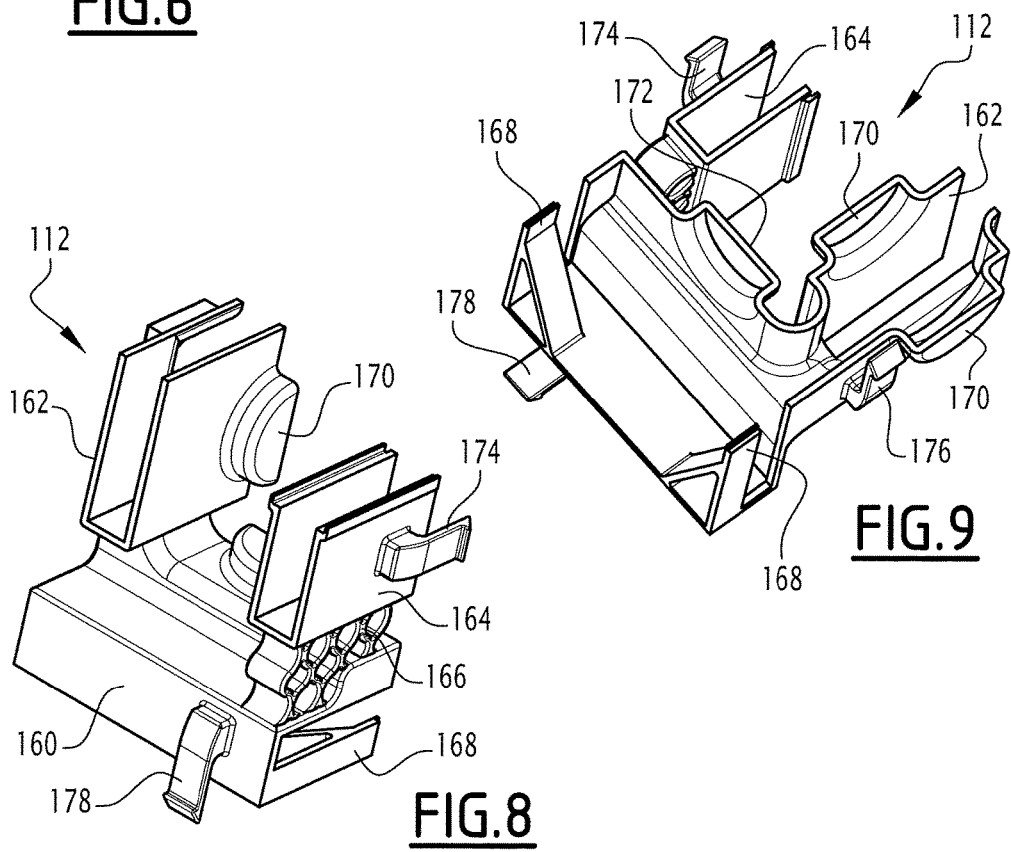

PROTECTIVE HOUSING FOR AN ELECTRICAL INSTALLATION AND ELECTRICAL INSTALLATION INCLUDING SUCH A HOUSING

The invention relates to a protection box for an electric installation and an electric installation including such a protection box.

The electric installations, such as electric switchboards, generally include one or more busbars, electrically conducting by phase, which allow electric current to be distributed inside the installation. The busbars can be connected to other busbars or to a connection area of an electric device.

The use is known of electrically insulating protection boxes that are installed at junction zones between two busbars or between a busbar and an electric device, for example as described in EP 0 435 772 B1. Such protection boxes prevent in particular the formation of electric arcs between live conducting elements when the electric installation is operating.

One disadvantage of the known protection boxes is that their shape does not always correspond to the geometrical conformation of the junction zones between busbars and/or electric devices. In practice, the electric installations can have multiple configurations very different compared with each other and it is difficult to envisage in advance a shape of protection box that suits all these configurations. In addition, the protection boxes are generally manufactured in moulded plastic, so that to design and manufacture a box mould for each theoretically possible configuration is not feasible from an industrial viewpoint.

It is thus frequent that protection boxes installed so as to correspond to several configurations have shapes different from the shape of the junction zones, so that these junction zones are only imperfectly protected by such protection boxes.

In particular, this shape difference often gives rise to the presence of a spacing between the busbars and the inside walls of the box, in which spacing an air gap is formed, trapped inside the protection box. When the electric installation is operating, the heat produced by Joule effect by the circulation of current in the busbars gives rise to an increase in temperature of the air gap. The heat dissipation towards the outside of the protection box is limited. The result is heating that can become significant to the extent of degrading the performance of the electric distribution installation, perhaps of compromising the safety and integrity of the electric installation.

A need therefore exists for a protection box for an electric installation that remedies the disadvantages described above.

For this purpose, the invention relates to an electrically insulating protection box for an electric installation including at least one electric busbar, the protection box including at least two casings. Each casing includes inside surfaces intended to surround at least a part of the busbar at a junction zone, at least 50% of the area of said inside surfaces being in direct contact with an electrically conducting element of the junction zone.

Thus, by increasing the inside surface of the box that is in contact with the busbar(s) and its/their connection system(s) at the junction zone, the volume of air trapped inside the box and in direct contact with the busbar is reduced. The risk of degradation of performance linked with heating is therefore diminished.

According to advantageous but not obligatory aspects of the invention, such a protection box can incorporate one or more of the following characteristics, taken in isolation or according to any technically admissible combination:

The junction zone includes a fastener element, such as a screw or a bolt, for securing said busbar to an electrically conducting element in the junction zone, and the contact surface includes a hollowed portion that delimits a housing for accommodating a head of the fastener element.

A non-zero radial clearance is arranged between the fastener element and the side walls of the accommodation housing.

The casings include complementary fastener components for reversibly attaching the casings to each other, such as strips associated with slots of corresponding shape.

The strips have a width between 5 mm and 20 mm and a thickness between 2 mm and 4 mm.

At least one of the casings includes opposite side walls intended to surround a busbar on both sides, said walls being dimensioned with a negative clearance, that is to say with a spacing with respect to each other that is smaller than the corresponding dimension of the busbar.

The negative clearance is between 0.1 mm and 0.8 mm.

The protection box is manufactured by means of an additive manufacturing process, for example a process of selective laser sintering or by fused deposit modelling.

At least one outside wall of the box includes a customized mark integrated in the outside wall, for example in relief, in particular for displaying an identification code or product part number or for identifying a temperature measurement zone defining a preferred positioning location for an external temperature sensor.

According to another aspect, the invention relates to an electric installation, such as an electric switchboard, including at least one electric busbar connected to an electrically conducting element, such as another electric busbar or to an electric device, the electric installation including an electrically insulating protection box installed on said busbar at a junction zone between said bar and the other electrically conducting element, the protection box being as described previously.

Figure 2:
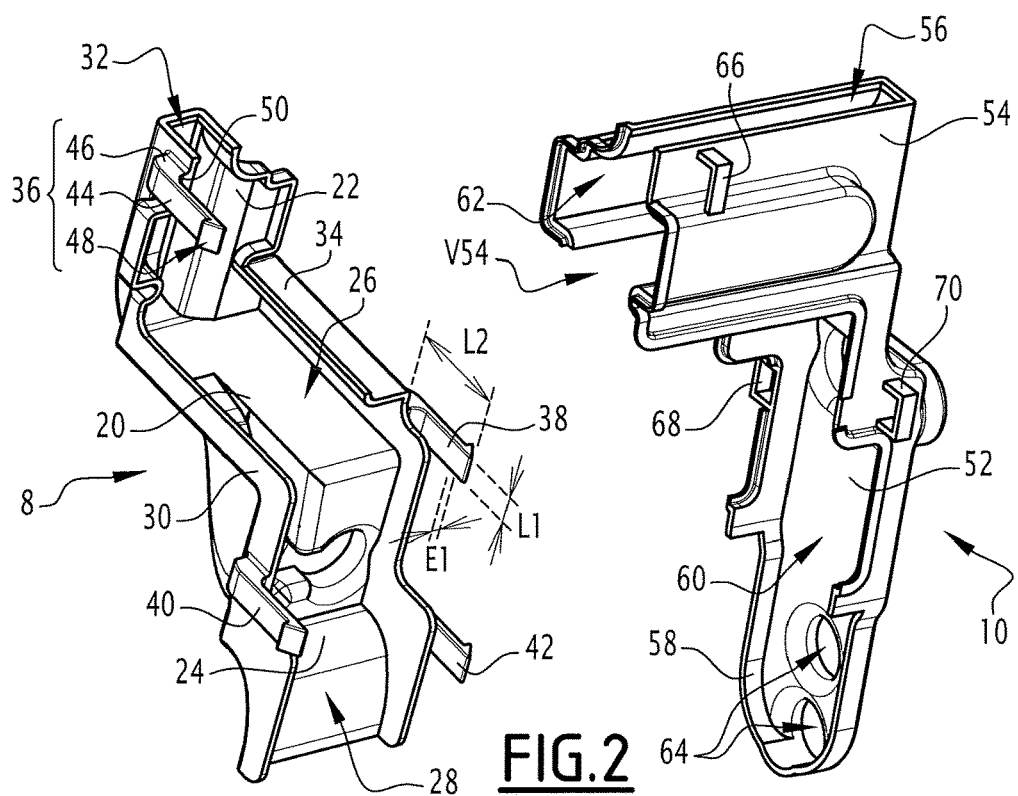
Figure 3:
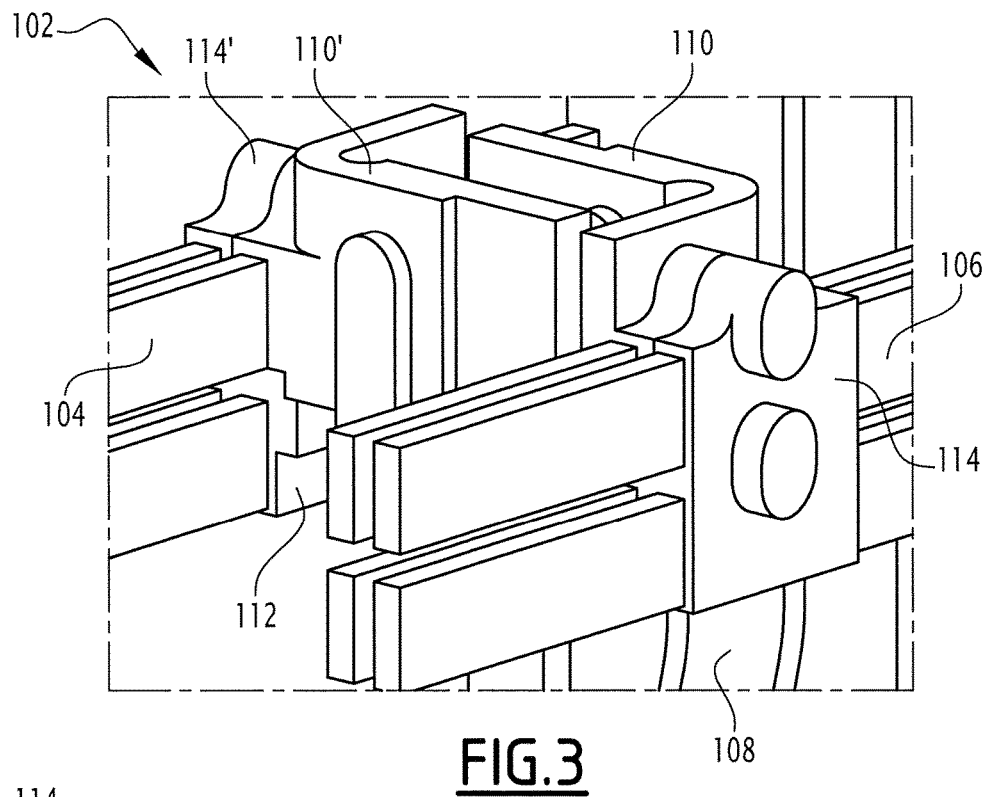
Figures 4, 5:
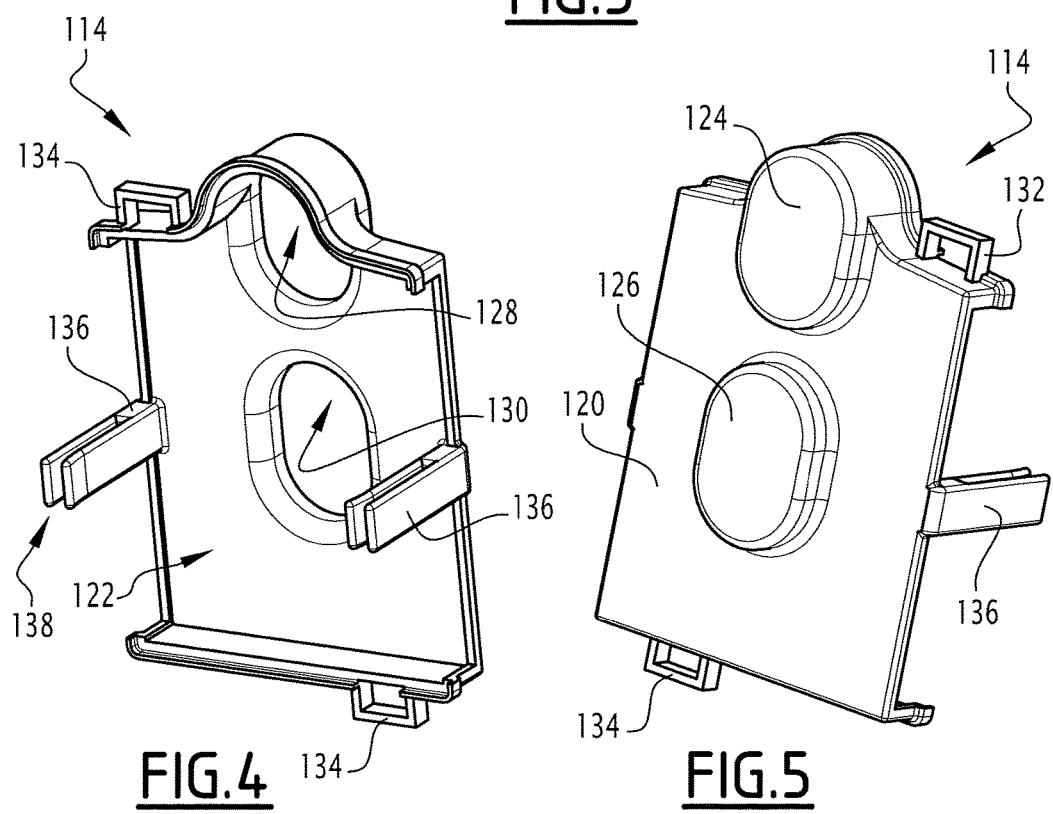

The invention will be better understood and other advantages of same will emerge more clearly in the light of the description that will follow of an embodiment of a protection box, description given only as an example and made with reference to the attached drawings, in which:

FIG. 1 schematically shows a first electric installation including a protection box according to a first embodiment of the invention;

FIG. 2 schematically shows the protection box of FIG. 1 as an exploded view;

FIG. 3 schematically shows a second electric installation including a protection box according to a second embodiment of the invention;

FIGS. 4 and 5 schematically show a first part of the protection box of FIG. 3 in two different orientations;

FIGS. 6 and 7 schematically show a second part of the protection box of FIG. 3 in two different orientations;

FIGS. 8 and 9 schematically show a third part of the protection box of FIG. 3 in two different orientations.

FIG. 1 shows a first electric installation 1 provided with a protection box 2 for protecting a junction zone ensuring an electric connection between an electric busbar 4 and another electrically conducting element of the installation 1, here with a connection area of an electric device 6. For example, the installation 1 is an electric switchboard.

The busbar 4 is a bar in an electrically conducting material, preferably a metal material, in particular copper or aluminium, that serves to transport and distribute an electric current in the electric installation 1.

The electric device 6 here is an electric switching device, such as a circuit breaker or a contactor, or a distribution or electric metering device for domestic or industrial use.

The protection box 2 allows protection of the junction zone to be ensured between the bar 4 and the device 6. For this purpose, the box 2 is intended to be installed on the junction zone.

On one hand, the box 2 ensures mechanical protection preventing accidental contact with the electrically conducting elements belonging to the junction zone and also preventing the insertion of elements external to the installation 1.

The box 2 is preferably sealed, for example with protection level against solid bodies better than or equal to the protection level IP4x defined by Standard IEC 60529.

On the other, the box 2 is electrically insulating and is made in an electrically insulating material, for example in plastic material. This makes it possible in particular to avoid the formation of electric arcs between electrically conducting elements of the installation 1 when the installation 1 is operating.

In a general way, the box 2 includes at least two casings, perhaps more, intended to be assembled to form the box 2. Each casing includes inside surfaces intended to come into contact with the bar 4 so as to surround at least a part of the bar 4 at the junction zone, at least 50% of the area of said inside surfaces being in direct contact with an electrically conducting element of the junction zone (in this case, with the bar or the connection area of the device or the connection piece), and preferably at least 60% or 75% or 80% of the area of said inside surfaces.

By increasing the inside surface of the box that is in contact with the busbar at the junction zone, the volume of air trapped inside the box and in direct contact with the busbar is reduced. The risk of heating is therefore diminished. In other words, the box 2 makes it possible, by its customized shape, to adhere to the bar 4 and to the junction zone.

In addition, due to the presence of the air gap, it is difficult, perhaps impossible, to measure the temperature of the bar 4 with precision from outside a known box. For example, by placing a temperature sensor or a contactless temperature measuring device on an outside wall of a known box, the measured temperature is not representative of the true temperature of the bar 4 because of the air gap trapped between the wall of the box and the bar 4. In contrast, with the box 2, such a measurement is easy to implement at the walls of the box 2, which are in direct contact with the bar 4 or more generally with the conducting elements in the junction zone. The measurement is also more representative of the true temperature.

According to implementation examples, when the junction zone includes a fastener element, such as a screw or a bolt, for securing said busbar 4 to the other electrically conducting element, then the contact surface advantageously includes a hollowed or domed portion, preferably oblong or circular in shape, that delimits a housing for accommodating a head of the fastener element.

The inside wall forming the bottom of the accommodation housing is preferably in direct contact with the head of the fastener element, the latter also generally being live since connected to the busbar and generally made in a metal material. For example, the area of this inside wall is included in the total area of the inside surfaces described above.

In practice, a radial clearance between the fastener element and the side walls of the accommodation housing is authorized so as to facilitate the installation of the box 2.

According to particularly advantageous embodiments, the box 2 is manufactured by means of an additive manufacturing process, for example by a selective laser sintering process or by a fused deposit modelling process, or by other equivalent processes.

The additive manufacturing allows the box 2 to be industrially "customized" or manufactured in small production runs depending on the particular geometric configuration of the junction zone of the installation 1. This is simpler to implement than producing a specific mould in order subsequently to manufacture the box 2 by moulding.

For example, in order to customize a box 2 for a given installation 1, a prior design step is implemented, based on a digital three-dimensional model of the installation 1 or based on a digital topographical record of the shape of the installation 1.

Advantageously, the additive manufacturing also allows the addition of a customized mark integrated in an outside wall of the box 2, for example in relief, in particular for displaying an identification code or product part number of the box 2 that can be specific to each manufactured model of the box 2.

The mark can also, as a variant, serve to identify a temperature measurement zone, by a mark in relief integral to the box, thus delimiting a preferred positioning location of an external temperature sensor or a sight location of a contactless temperature measurement device, for example, an infrared camera. The measurement zone is preferably arranged at a wall of the box 2 intended to come into direct contact with a conducting element of the connection zone, in particular with the bar 4.

FIGS. 1 and 2 illustrate in more detail an example of an embodiment of the box 2. The bar 4 here is oriented vertically and the junction zone is formed on the lower end of the bar 4. The connection area is formed at an upper end of a front face of the device 6. The bar 4 and the connection area here are connected by a connection piece, not described in detail, but nevertheless visible on FIG. 1, the connection piece here being part of the junction zone.

It is nevertheless understood that other forms and configurations of the box 2 are possible so as to adapt to the shape of the connection zone on which the box 2 is intended to be assembled.

The box 2 here includes a first casing 8 intended to be placed at the back of the bar 4 and a second casing 10 intended to be interlocked with the first casing 8 and to be placed at the front of the bar 4 so as to cover the connection area.

The first casing 8 includes a main part 20, extending horizontally here, an upper secondary part 22 and a lower secondary part 24. The secondary parts 22, 24 extend vertically, perpendicularly to the main part 20, in opposite directions, from opposite ends of the main part 20. Each casing 8, 10 here is manufactured in one piece.

Each part 20, 22 and 24 includes an inside surface intended to come into direct contact with the bar 4 when the box 2 is in installed configuration.

For example, the inside surface 26 of the part 20 is intended to come into contact with a lower end of the bar 4. The inside surface 28 of the part 24 is intended to come into contact with a back face of the connection piece.

The casing 8 includes side edges 30 that extend on the respective side edges of the parts 20, 22 and 24 towards the inside of the box 2. On the upper part 22, the side edges 30 define an upper slot 32 intended to accommodate the back of the bar 4. In the illustrated example, one of the side edges 30 of the main part 20 is extended by a folded wall 34 that turns in towards the inside of the casing 8 while extending parallel to the surface 26 over a distance smaller than or equal to half the width of the surface 26. The folded wall 34 advantageously serves as a guide element when installing the box 2.

Advantageously, the casings 8 and 10 of the box 2 include complementary fastener components for reversibly attaching the casings 8 and 10 to each other, for example male and female fastener elements, in particular strips or hooks associated with slots of corresponding shape.

For this purpose, the casing 8 includes strips 36, 38, 40 and 42, here four in number, although as a variant, this number can be different, for example between two and ten. The strips of one casing are preferably spaced from each other by a pitch greater than or equal to 80 mm. For example, the strips are perpendicular to the inside surfaces of the casing in contact with the bar 4.

The strips 36, 38, 40 and 42 are identical here, so that the description below of a strip can be transposed to the other strips of the casing 8.

It is also understood that, as a variant, the strips can be arranged on the casing 10 instead of the casing 8, or can be shared between the casings 8 and 10. The corresponding slots are then disposed accordingly on the casing 8 and/or on the casing 10.

In this example, each strip 36, 38, 40 and 42 extends longitudinally from a side edge 30 of the casing 8, that is to say in a direction parallel to the part 20, towards the front of the casing 8, that is to say, in the direction of the casing 10.

For example, the strip 36 is installed on the left side edge 30 of the part 22, the strip 38 is assembled on the right side edge 30 of the part 20, and the strips 40 and 42 are assembled on the opposite side edges 30 of the part 24.

Each strip 36, 38, 40 and 42 includes a flexible longitudinal body 44 in a blade shape, one back end 46 of which is integral with a side edge 30 and one front end of which includes a head 48, here in a hook shape.

Once the strip is inserted in a slot, the head 48 abuts the edges of the slot and prevents the strip from exiting the slot by translation towards the back, so that the longitudinal body 44 must subsequently be deformed deliberately if it is wished to remove the strip from the slot.

The reference E1 designates the thickness of the longitudinal body 44 and the reference L1 designates the width of the longitudinal body 44. The reference L2 designates the length of the longitudinal body 44 measured between a base of the head 48 and an end edge 50.

According to illustrative examples, the width L1 is between 5 mm and 20 mm, preferably between 8 mm and 12 mm. The thickness E1 is between 2 mm and 4 mm, preferably equal to 2.5 mm.

The length L2 is chosen here so as to have a negative clearance between the casings 8 and 10 at no load so as to assist the casings 8 and 10 in pressing on the bars and on each other once installed on the bar 4 and secured by the fastener components. The negative clearance, designated LN, is for example between 0 mm and 1 mm, preferably between 0 and 0.2 mm.

For example, a first sub-length L3 and a second sub-length L4, not illustrated, are also defined for the longitudinal body 44, which are defined here according to the position of the strip in the complementary slot. In practice, when the strip is inserted in the slot, the casing 8 abuts forwards against a portion of the casing 10, for example a protrusion-forming excrescence placed on the casing 10 to the rear of the slot.

The first sub-length L3 corresponds to the length of the longitudinal body 44 measured between, on one hand, the slot in which the strip is inserted and on the other, the stop against which the casing 8 presses. The second sub-length L4 corresponds to the length between the slot and the base of the longitudinal body 44. The sum of the sub-lengths L3 and L4 is equal to the length L2. For example, the value L2-L4 is between the length L3 and the value L3-LN.

The second casing 10 includes here a main part 52 extending vertically and an upper part 54 that extends perpendicularly to the main part 52, towards the back of the casing 10. The main part 52 forms a front face of the box 2.

The upper part 54 delimits an accommodation volume V54 for accommodating the base of the bar 4 and includes an upper slot 56 that extends the slot 32 of the casing 8 so as to accommodate the bar 4.

When the box 2 is assembled, the upper part 22 of the casing 8 closes the volume V54 at the back, and the inside surface 26 of the part 20 of the casing 8 closes the volume V54 from below. The part 52 extends vertically over a length greater than the length of the lower part 24 of the casing 8.

The reference 60 designates a main inside wall of the part 52 and the reference 62 designates side walls of the upper part 54.

The part 52 advantageously includes a hollowed or domed portion 64 such as previously described. These domed portions are two in number here and here allow the accommodation of the heads of elements for fastening the junction zone that project from the front face of the device as visible on FIG. 1.

In this example, the casing 10 also includes slots 66, 68, 70 complementary with the strips 36, 38, 40 and 42. The slots here are four in number but only three are visible on FIG. 2 due to the chosen orientation. The slot for the strip 38 is not shown. The slots 66, 68 and 70 cooperate with the strips 36, 42 and 40 respectively, and are identical here to each other. For example, the width of each strip is between 5 mm and 20 mm, preferably between 8 mm and 12 mm. The thickness of each strip is between 2 mm and 4 mm, preferably equal to 2.5 mm.

According to preferred implementations, the distance between two opposite side walls of the box 2 intended to surround the busbar 4 on both sides, this distance being measured when the box 2 is not installed on the bar 4, is less than or equal to the thickness of the bar 4.

In doing so, a negative clearance, or negative dimensional tolerance, is obtained between the opposite side walls so as to pre-stress the box 2 and to assist mechanical contact of the inside walls of the box 2 with the bar 4 once the box is in installed configuration. As an illustration, the negative clearance is between 0.1 mm and 0.8 mm.

For example, such a negative clearance is implemented for the side walls 30 of the casing 8 and also for the side walls 62 of the casing 10. According to variants, such a negative clearance can be implemented for a dimension of the bar 4 other than its thickness, for example its width. The negative clearance can also be implemented for any other electrically conducting element of the junction zone.

FIGS. 3 to 9 show a protection box 102 according to a second embodiment of the invention. The box 102 has the same function as the box 2 and what was described previously with reference to the box 2 applies here, in particular as far as the protection and manufacturing methods of the box are concerned. Only the differences of shape and appearance compared with the box 2 described in the first embodiment are described in detail here, insofar as the general description of the protection box made above can be transposed to the box 102.

FIG. 3 shows a second electric installation 100 provided with the protection box 102 for protecting a junction zone ensuring an electric connection between two groups of first horizontal electric busbars 104, 106 and a group of vertical electric busbars 108, an upper end of which is situated between the groups of bars 104 and 106.

The bars 104, 106 and 108 are similar to the bar 4 and fulfil a similar function. The junction zone here is formed at the upper end of the bars 108, for example by means of an electrically conducting element, such as a metal piece, permanently connecting the bars 104, 106 and 108 together.

The box 102 includes a pair of first casings 110, a pair of second casings 112 and a pair of third casings 114, which are assembled together around the junction zone. Each casing 110, 112, 114 here is manufactured in one piece.

In this example, the casings of each pair are identical to each other. On FIG. 3, the reference 110' is used to distinguish the two identical models of the pair of first casings 110. The same applies for the reference 114'.

The casings 112 are installed on the upper ends of the bars 108, for example around the connection piece. The casings 110 are intended to be coupled together around the casings 112. The casings 114 are installed on the outside of the bars 104, 106 and are connected to the casings 110.

As illustrated on FIGS. 4 and 5, the casing 114 includes a main wall 120 provided with an inside surface 122 forming a back face of the wall 120.

In this example, the wall 120 also includes two hollowed or domed portions 124, 126 such as described previously and for example similar to the portions 64. The inside faces of the domed portions 124, 126 bear the references 128 and 130, respectively.

The casing 114 also includes fastener components, here of the female type, in the shape of slots 132 and 134. A slot 134 extends protruding under a lower edge of the wall 120, while the slot 132 extends protruding on an upper edge of the wall 120.

Advantageously, guide structures 136 formed on the side edges of the wall 120 extend perpendicularly with respect to the wall 120, towards the back of the casing 114. The structures 136 have one fork-shaped end 138 including two parallel jaws whose role is defined in the following.

As illustrated on FIGS. 6 and 7, the casing 110 includes two parts 140 and 142, elbowed at right angles, which form an envelope delimiting an inside housing that emerges onto a lower slot 144 so as to accommodate the upper ends of the bars 108. In other words, the casings 110 come to cap the upper ends of the vertical bars 108.

The part 142 also includes a side opening 146 arranged on a front face and surmounted by a rounded portion. The opening 146 is laterally bordered by vertical tabs 148, which are parallel to the front face of the part 142 but which are arranged at a distance from same by being separated from same by a vertical space 150, oblong in shape.

A fastener component 152 of the strip type extends protruding perpendicularly to the front face of the part 142. Two fastening components 154, 156 of the slot type are formed on the edges of the slot 144 on the same side of the part 140.

Advantageously, the walls of the parts 140 and 142 include hollowed or domed portions 158 similar to those previously described.

As illustrated on FIGS. 8 and 9, the casing 112 defines a first housing 160 and two secondary housings 162 and 164, walls of which are connected to a wall of the first housing 160 by connection portions 166. The housing 160 includes vertical tabs 168 similar to the tabs 148.

The side walls of the housing 162 here include two hollowed or domed portions 170 similar to those described previously, and the housing 160 includes such a domed portion 172 on one of its walls.

Two fastener components 174, 176 of the strip type extend vertically from outside side walls of the housings 164 and 162, respectively. A third fastening component 178 of the strip type extends from a lower outside side wall of the housing 160.

The fastener components of the box 102 are similar to those of the box 2 previously described, and the dimensioning rules and values described above are applicable to same.

When the box 102 is assembled and installed in the installation 100, the tabs 168 are aligned with the tabs 148. The side bars 104 are accommodated in the openings 150 delimited by the casings 114' and 112, and the side bars 106 are accommodated in the openings 150 delimited by the casings 114 and 112. Furthermore, the strips 152 are accommodated in the slots 132 and the strips 178 are accommodated in the slots 134. The strips 174 and 176 are accommodated in the slots 154 and 156, respectively.

The embodiments and the variants envisaged above can be combined together to generate new embodiments.

The invention claimed is:

1. An electrically insulating protection box for an electric installation comprising at least one electric busbar, the protection box including at least two casings wherein each casing includes inside surfaces intended to surround at least a part of the busbar at a junction zone, at least 50% of the area of said inside surfaces being a contact surface in direct contact with an electrically conducting element of the junction zone, said protection box being manufactured with an additive manufacturing process, wherein the junction zone includes a fastener element for securing said busbar to an electrically conducting element in the junction zone, and wherein the contact surface includes a hollowed portion that delimits a housing for accommodating a head of the fastener element, and wherein the fastener element comprises a screw.

2. The protection box according to claim 1, wherein a non-zero radial clearance is arranged between the fastener element and the side walls of the accommodation housing.

3. The protection box according to claim 1, wherein the casings include complementary fastener components for reversibly attaching the casings to each other.

4. The protection box according to claim 3, wherein the complementary fastener components are strips having a width between 5 mm and 20 mm and a thickness between 2 mm and 4 mm.

5. The protection box according to claim 1, wherein at least one of the casings includes opposite side walls configured to surround a busbar on both sides, said walls being dimensioned with a negative clearance, with a spacing with respect to each other that is smaller than the corresponding dimension of the busbar.

6. The protection box according to claim 5, wherein the negative clearance is between 0.1 mm and 0.8 mm.

7. The protection box according to claim 1, wherein at least one outside wall of the box includes a customized mark integrated in the outside wall.

8. An electric installation, such as an electric switchboard, comprising at least one electric busbar connected to an electrically conducting element, such as another electric busbar or to an electric device, the electric installation including an electrically insulating protection box installed on said busbar at a junction zone between said bar and the other electrically conducting element, wherein the protection box conforms to claim 1.

9. The protection box according to claim 1, wherein the additive manufacturing process comprises selective laser sintering.

10. The protection box according to claim 1, wherein the additive manufacturing process comprises fused deposit modelling.

11. The protection box according to claim 3, wherein the complementary fastener components include strips associated with slots of corresponding shape.

12. The protection box according to claim 1, wherein at least one outside wall of the box includes a customized mark integrated in the outside wall in relief for displaying at least one of an identification code, a product part number and a temperature measurement zone defining a preferred positioning location for an external temperature sensor.

13. An electrically insulating protection box for an electric installation comprising at least one electric busbar, the protection box including at least two casings wherein each casing includes inside surfaces intended to surround at least a part of the busbar at a junction zone, at least 50% of the area of said inside surfaces being a contact surface in direct contact with an electrically conducting element of the junction zone, said protection box being manufactured with an additive manufacturing process, wherein the junction zone includes a fastener element for securing said busbar to an electrically conducting element in the junction zone, and wherein the contact surface includes a hollowed portion that delimits a housing for accommodating a head of the fastener element, and wherein the fastener element comprises a bolt.

14. The protection box according to claim 13, wherein a non-zero radial clearance is arranged between the fastener element and the side walls of the accommodation housing.

15. The protection box according to claim 13, wherein the casings include complementary fastener components for reversibly attaching the casings to each other.

16. The protection box according to claim 15, wherein the complementary fastener components are strips having a width between 5 mm and 20 mm and a thickness between 2 mm and 4 mm.

17. The protection box according to claim 13, wherein at least one of the casings includes opposite side walls configured to surround a busbar on both sides, said walls being dimensioned with a negative clearance, with a spacing with respect to each other that is smaller than the corresponding dimension of the busbar.

18. The protection box according to claim 17, wherein the negative clearance is between 0.1 mm and 0.8 mm.

19. The protection box according to claim 13, wherein at least one outside wall of the box includes a customized mark integrated in the outside wall.

20. An electric installation, such as an electric switchboard, comprising at least one electric busbar connected to an electrically conducting element, such as another electric busbar or to an electric device, the electric installation including an electrically insulating protection box installed on said busbar at a junction zone between said bar and the other electrically conducting element, wherein the protection box conforms to claim 13.

21. The protection box according to claim 13, wherein the additive manufacturing process comprises selective laser sintering.

22. The protection box according to claim 13, wherein the additive manufacturing process comprises fused deposit modelling.

23. The protection box according to claim 15, wherein the complementary fastener components include strips associated with slots of corresponding shape.

24. The protection box according to claim 13, wherein at least one outside wall of the box includes a customized mark integrated in the outside wall in relief for displaying at least one of an identification code, a product part number and a temperature measurement zone defining a preferred positioning location for an external temperature sensor.

\* \* \* \* \*